United States Patent [19]

Blanton

[11] Patent Number: 4,497,598
[45] Date of Patent: Feb. 5, 1985

[54] METHOD AND APPARATUS FOR CONTROLLED RATE FEEDING OF FLUIDIZED SOLIDS

[75] Inventor: William A. Blanton, Woodacre, Calif.

[73] Assignee: Chevron Research Company, San Francisco, Calif.

[21] Appl. No.: 443,117

[22] Filed: Nov. 19, 1982

[51] Int. Cl.³ .............................................. B65G 53/24
[52] U.S. Cl. ................... 406/114; 406/146; 406/142
[58] Field of Search ................ 406/113–116, 406/138, 141, 142, 143, 136, 146

[56] References Cited

U.S. PATENT DOCUMENTS

| 2,541,077 | 2/1951 | Leffer | 406/143 X |
| 3,206,078 | 9/1965 | Leimegger | 406/138 X |
| 3,854,634 | 12/1974 | Hart | 406/136 |

FOREIGN PATENT DOCUMENTS

| 874283 | 6/1971 | Canada | 406/146 |
| 538231 | 11/1977 | U.S.S.R. | 406/142 |

*Primary Examiner*—Jeffrey V. Nase
*Assistant Examiner*—L. E. Williams

*Attorney, Agent, or Firm*—Burns, Doane, Swecker & Mathis

[57] ABSTRACT

The vapor space above a bed of fluidizable particles in a chamber is variably controlled by extending a moveable conduit through the upper portion of the chamber to position the conduit inlet at a selectable height above the bed. Fluid flows uniformly up through the bed of particles to fluidize particles to a desired density in the fluid and at a desired rate of flow of such particles through the inlet to the conduit from the so adjusted volume of fluidization space in the chamber. The conduit is externally driven relative to the bed to maintain the particle fluidization volume and flow rate substantially constant. In apparatus form the pick-up conduit is carried by a piston member with sealing means, such as an O-ring, between the piston wall and the chamber sidewall. In an alternate embodiment the fluidizing gas is recirculated in a loop that includes the piston which is fluid permeable to bypass the conduit inlet. This permits a substantially constant rate of fluid flow to fluidize particles to a desired density, but permits independent control of the rate of flow of fluidized particles out of the chamber.

8 Claims, 2 Drawing Figures

METHOD AND APPARATUS FOR CONTROLLED RATE FEEDING OF FLUIDIZED SOLIDS

FIELD OF THE INVENTION

The present invention relates to fluidization of solid particles into a gas stream. More particularly, it relates to a method of and apparatus for controlling the addition rate of fluidizing solid particles to obtain a given density of particles in a flowing fluid stream.

It is a particular object of the invention to control the rate of flow of solid particles into a gas stream from a chamber containing a bed of such particles to obtain a given density of particles in the flowing stream. To obtain such density, a fluidizing gas flows upwardly through a bed of solid particles confined in the lower portion of a chamber. A moveable conduit extending from the upper end of the chamber is positioned so that its inlet is at a selected height above the bed of particles. In this way the transporting fluid fluidizes particles in the upper portion of the bed into a controlled density in a predeterminable volume formed by the vapor space between the bed and the conduit inlet. The distance the conduit inlet is positioned above the bed is continuously adjusted in accordance with both the particle density and rate of flow so as to maintain the vapor space substantially constant as the particles are fluidized into the vapor stream. In a preferred form, a moveable upper end wall in the chamber surrounds the conduit inlet and moves with the conduit. Preferably the moveable wall is a piston member having a moveable seal engaging the chamber wall outside of the bed of particles to enclose the chamber as a pressure vessel of variable volume. In an alternate arrangement, a portion of the fluidizing gas is recirculated through an auxiliary loop to maintain a higher fluidizing flow through the bed of particles than is necessary or desired for a given flow rate for particles through the conduit inlet. This permits control of the relative density of particles in the fluid, independent of flow rate through the transport or pick-up conduit.

BACKGROUND OF THE INVENTION

Fluidizing powdered or finely divided solids into a vapor stream is frequently required for adequate mixing and transport in various mechanical and chemical systems.

For example it is known to move sand, catalyst particles, comminuted coal, shale or the like from a chamber or cylinder by a piston acting directly against the particulate matter to entrain a portion of the bed into a fluid stream flowing over, or through a portion of the top of the mechanically raised bed of particles. In U.S. Pat. No. 1,578,944—Wilkinson and U.S. Pat. No. 2,708,140—Reed, the particle bed is mechanically raised by a piston moving upwardly in a chamber to force the particles at the top of the bed into contact with a flowing stream. In the latter patent, fluidization is aided by fluid flow upwardly through the lifted bed. U.S. Pat. No. 2,077,898 discloses a system in which the bed of particles moves downwardly by gravity and is assisted by a piston moving downwardly in the chamber. Fluid flows between the cylinder wall and the piston to entrain particles flowing out of the bottom of the chamber.

It is also known, as in U.S. Pat. No. 3,179,378—Zenz et al, to mix and transport finely divided solids by entraining the solid particles fed by gravity from an overhead shell or bin into a conduit inlet by an upwardly flowing gas stream. The inlet to the conduit may be moved up or down to control the rate particles are released from the overhead bin. Also gas pressure is applied to the upper end of the shell to force particles down into a conical section forming feed means into the gas stream.

U.S. Pat. No. 3,412,898—Marynowski discloses an arrangement for feeding a powdered material into a conduit from a chamber in which gas flows up through a bed of the material. Material is continuously or periodically added to the top of the bed to replace the entrained material. The fluidized particles-in-gas stream passes into an overhead conduit having an inlet at a fixed elevation in the chamber. A portion of the fluid flow is withdrawn through a permeable partition surrounding the conduit to control the leanness of the suspension in the fluid stream.

U.S. Pat. No. 2,789,015—Ward et al discloses a system for incorporating a powder material into an air stream by passing the air up through a bed of starch or the like in the bottom of a chamber. A fluidized powder pick-up, includes a conduit formed by an accordian hose surrounded by a pick-up cone which rests without restraint on the surface of the powder bed. The cone drops with the falling surface of the powder as it is entrained in air.

SUMMARY OF THE INVENTION

As particularly distinguished from the prior art, and specifically the Ward et al patent, it is a primary object of the present invention to provide a method and apparatus for variably controlling the vapor space above a bed of fluidizable particles in a chamber by extending a moveable conduit through the upper portion of the chamber to position the conduit inlet at a selectable height above the bed. Fluid then flows uniformly up through the bed of particles to fluidize particles to a desired density in the fluid and at a desired rate of flow of such particles through the inlet to the conduit from the so adjusted volume of the fluidized particle space in the chamber. The conduit is then externally driven relative to the bed so that the fluidized particle volume and flow rate may be maintained substantially constant.

In a preferred form of apparatus for carrying out the invention, the conduit is surrounded by a transverse wall forming a moveable upper end wall for the chamber. A further preferred form includes sealing means, such as an O-ring, between the moveable wall and the chamber sidewall which is outside of the fluidization volume to assure a constant rate of drive of the wall. Such construction in conjunction with fluid flow through the chamber permits accurate control of pressure in the vapor space above the bed of particles. An alternate embodiment of the invention includes a recirculation loop for the fluidizing gas to bypass the moveable inlet so as to maintain a substantially constant rate of fluid flow for fluidizing particles to a desired density and to transport particles at a substantially constant rate into said inlet, independent of fluidized particle density.

The invention is particularly useful for introduction of small quantities of finely divided particles into a flow system. Most specifically, the arrangement has particular utility in adding catalyst particles to a pilot plant for evaluating fluid catalytic cracking of hydrocarbonaceous materials.

Further objects and advantages of the invention will become apparent to those skilled in the art from the following detailed description of the preferred embodiments taken with the drawings which form an integral part of this specification.

PREFERRED EMBODIMENTS OF THE INVENTION

Figure 1:
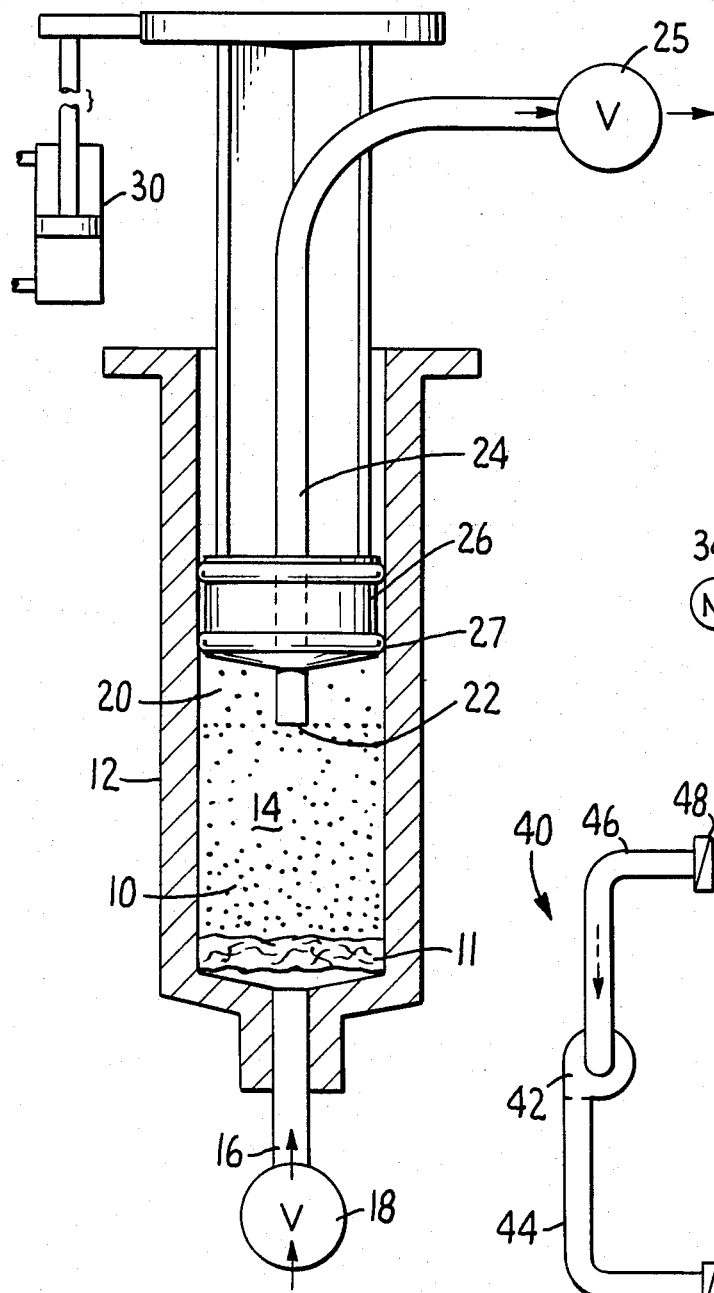
FIG. 1 is a vertical elevation view, partially in cross-section, of a preferred embodiment of the invention.
Figure 2:
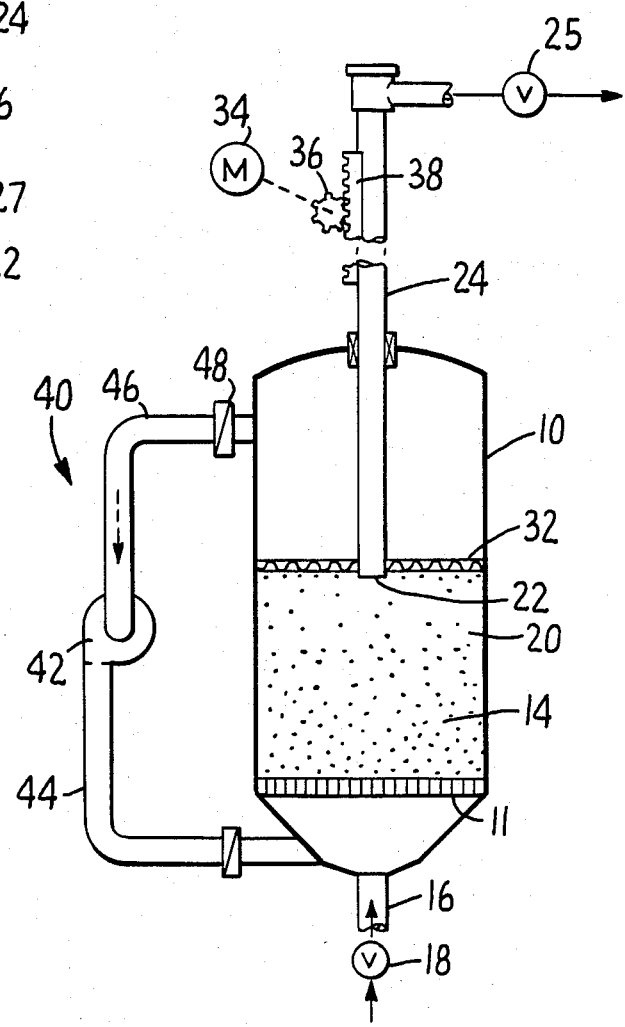
FIG. 2 is a vertical elevation view, partially in cross-section, of an alternate embodiment of the invention, including a bypass flow loop for maintaining a desired flow rate through the bed of particles to fluidize the particles to a desired density in the fluid stream which is independent of the rate of flow of the fluid stream from the enclosing chamber.

Referring now to the drawings, and in particular to FIG. 1, a chamber 10, such as that formed by a syringe barrel 12, supports a bed 14 of solid particulate material, such as fluid catalytic cracking catalyst, having average diameters on the order of 10 to 100 μm (micrometers). Such particles are to be fed at a selectable density and rate of flow in a fluidizing gas, such as air, nitrogen or steam, entering barrel 12 through line 16. Fluidizing gas flows up through permeable support or distributor plate 11 and bed 14 at a preselectable rate, adjustable as by valve 18, and levitates or fluidizes, the upper portion of bed 14 into vapor or fluidizing space 20 defined by the position of inlet 22 of pick-up conduit or transfer line 24. Alternatively, such flow rate may be controlled by valve 25 in line 24.

In the embodiment of FIG. 1, the location of inlet 22 is determined by the position of drive plunger 26 to which conduit 24 is attached. To assure that all flow through chamber 10 passes into inlet 22, plunger 26 includes a sliding seal, such as O-ring 27. In this way, the position of inlet 22 in turn predetermines the volume of fluidizing space 20 above bed 14 and is controlled by external movement of drive plunger 26 through barrel 12. As indicated, plunger 26 may be mechanically driven as by hydraulic means 30, or hand actuated, to control both the density of the particle-gas stream and the rate of flow.

FIG. 2 illustrates another embodiment of the invention wherein the rate of flow of fluid through bed 14 may be controlled independent of the rate of flow into transfer line 24. This in turn permits the density of particles fluidized in space 20 to be controlled to a desired value, independent of transfer line flow rate. For this purpose inlet 22 is surrounded by a fluid permeable member 32 secured to tube 24. As indicated tube 24 may be mechanically driven to establish the size of volume 20, as by electric motor 34 rotating pinion 36 to drive gear rack 38 secured to tube 24. Permeable member 32 thus forms a moveable by-pass for fluid so that a portion of the fluid may be recirculated in loop 40. Loop 40 includes fluid pump 42 drawing fluid from the top of chamber 10 through line 46 for return through line 44 as a part of the fluid entering the system through line 16. Because some of the finer particles may pass through member 32, inlet line 46 may include a filter element 48. A particular advantage of this embodiment is that the diameter of pick-up or transfer line 24 may be selected to produce a desired flow rate relative to the input fluid flow entering through conduit 16, independent of the selected rate of fluidization, or density.

In a preferred method of operarting the arrangement, drive of permeable member 32 in FIG. 2, or plunger 26 in FIG. 1, is preferably set at a constant rate as by the speed of actuator motor 34, or hydraulic actuator means 30. With such drive rate constant the flow rate of fluid may also be held constant to introduce solid particles into pickup tube 24. If desired, the rate of fluid flow or the drive rate of tube 24 may be held constant by optically measuring the particle density in the preselected vapor space 20 above bed 14. Such measurements are then used in an electrical feedback control system to regulate valves 18 or 25 or the speed of actuator 30 or 34.

The apparatus is illustrated as being applied to a system for addition of cracking catalyst to a fluid catalytic hydrocarbon cracking pilot plant. Such catalyst may be added to such a system with spent catalyst in a regeneration bed of a regenerator to heat the catalyst. The equipment will, of course, be dimensioned to provide the desired rate and total capacity of catalyst required by the system. As noted above, the method and apparatus for performing the method have found particular utility in pilot plant systems where it is essential to model accurately flow rates of catalyst particles being added to the reaction system and to assure that such flow rates are maintained constant when adding only a limited quantity of such material, say a few hundred grams over several minutes.

While only a few embodiments of the invention have been shown and described, various modifications and changes will occur to those skilled in the art from the foregoing specification without departing from the spirit and scope of the invention. All such changes or modifications coming within the terms of the appended claims are intended to be included therein.

I claim:

1. A method of controlling the rate of flow at a known density of fluidized solids being fed into a process which comprises:
   - confining a bed of solid particles to be fluidized to a lower portion of a chamber;
   - extending at least one moveable conduit through the upper portion of said chamber having an upper vapor space, said conduit being within a moveable piston member having a sliding peripheral seal and an inlet that extends beyond said piston, said piston member positionable by said conduit at a selectable height above said bed;
   - flowing a transporting and fluidizing fluid uniformly upwardly through said bed of solid particles in said chamber defined by said piston member to fluidized particles uniformly over the upper portion of said bed into said vapor space for flow into said conduit inlet;
   - adjusting the distance said moveable conduit extends into said chamber and the flow rate of said fluid to obtain a desired flow of particles in said fluid as a stream through said inlet; and
   - moving said moveable conduit inlet to maintain a substantially constant flow rate of fluidized particles in said stream.

2. A method in accordance with claim 1 wherein said moveable conduit inlet includes a transverse wall forming a moveable upper end wall for said chamber.

3. A method in accordance with claim 1 wherein a portion of the fluid flowing through said particles is recirculated in an auxiliary flow loop by-passing said moveable conduit inlet to maintain a substantially constant rate of fluidization of said particles and controlling the rate of fluid flow for transport of said particles at a substantially constant rate independent of the density of said particles in said stream.

4. A method of transporting particulate material in a fluid stream at a predeterminable rate of flow of said particles which comprises:

supporting a bed of said particles in the lower end of an enclosed chamber;

passing a fluid upwardly through said bed at a predetermined value of the flow rate adequate to entrain at least an upper portion of said bed into said fluid;

confining a given volume above said bed within said chamber to establish a given density of entrained particles in said fluid, said volume being defined by movable piston member having a sliding peripheral seal;

positioning a flow tube in said chamber so that the inlet thereto extends beyond said piston member into the upper portion of said given volume flowing at least a portion of the fluid having said given density of particles entrained therein from the upper end of said given volume into said inlet; and progressively moving said inlet downwardly at a rate to maintain said given density in said given volume above said bed and the rate of flow of said intrained particles through said flow tube at said predetermined value.

5. A method in accordance with claim 4 wherein said flow tube inlet includes a transverse wall forming a moveable upper end wall for said chamber.

6. A method in accordance with claim 4 wherein a portion of the fluid flowing through said particles is recirculated in an auxiliary flow loop by-passing said flow tube inlet to maintain a substantially constant rate of fluidization of said particles and controlling the rate of fluid flow for transport of said particles at a substantially constant rate independent of the density of said particles in said stream.

7. Apparatus for transporting a known quantity of particulate material to a conduit in a fluid medium over a given time period which comprises means forming a cylinder having a fluid flow inlet at its lower end, a piston member having a sliding peripheral seal and an inlet which extends beyond the piston in said cylinder said piston member being axially moveable in said cylinder to vary selectively the volume thereof, a permeable fluid flow distributor plate at the lower end of said cylinder for support of a bed of particles to be fluidized in said cylinder, inlet means for flowing a fluidizing and transporting fluid into said chamber below said distributor plate, a pick-up conduit for transporting particles entrained in said fluid out of the upper end of said chamber, said conduit having an inlet supported by said piston member to position said inlet within the variable volume of said cylinder, means external to said cylinder for driving said piston member at a desired rate to maintain a predeterminable volume in said cylinder for fluidization of the upper portion of a bed of particles supported therein, and means for controlling the rate of flow of fluid through said cylinder to maintain a given flow rate for particles entrained in said fluid.

8. Apparatus in accordance with claim 7 wherein said piston member is permeable to fluid flow and the upper end of said cylinder is connected to said lower end of said cylinder through an auxiliary flow circuit means which includes fluid pump means in the conduits forming said flow circuit means.

* * * * *